United States Patent [19]
Jackson et al.

[11] Patent Number: 5,864,127
[45] Date of Patent: Jan. 26, 1999

[54] ANALOG GLYPH DETECTOR AND DETECTOR ARRAYS

[75] Inventors: Warren B. Jackson, San Francisco; David K. Biegelsen, Portola Valley; David A. Jared, Sunnyvale; Richard G. Stearns, Felton, all of Calif.

[73] Assignee: Xerox Corporation, Stamford, Conn.

[21] Appl. No.: 728,654

[22] Filed: Oct. 10, 1996

[51] Int. Cl.$^6$ ........................................... G06K 7/10
[52] U.S. Cl. ............................. 235/454; 235/462
[58] Field of Search .................... 235/494, 462, 235/454, 472, 469, 436, 470

[56] References Cited

U.S. PATENT DOCUMENTS

| | | | |
|---|---|---|---|
| 4,716,438 | 12/1987 | Farrell | 355/6 |
| 4,786,940 | 11/1988 | Daniele | 355/6 |
| 5,128,525 | 7/1992 | Stearns et al. | 235/454 |
| 5,168,147 | 12/1992 | Bloomberg | 235/456 |
| 5,221,833 | 6/1993 | Hecht | 235/494 |
| 5,245,165 | 9/1993 | Zhang | 235/454 |
| 5,278,400 | 1/1994 | Appel | 235/494 |
| 5,315,098 | 5/1994 | Tow | 235/494 |
| 5,449,895 | 9/1995 | Hecht et al. | 235/494 |
| 5,449,896 | 9/1995 | Hecht et al. | 235/494 |
| 5,453,605 | 9/1995 | Hecht et al. | 235/494 |
| 5,521,372 | 5/1996 | Hecht et al. | 235/494 |
| 5,576,532 | 11/1996 | Hecht et al. | 235/494 |
| 5,659,167 | 8/1997 | Wang et al. | 235/472 |
| 5,710,874 | 1/1998 | Bergen | 395/115 |

OTHER PUBLICATIONS

"Embedded Data Glyph Technology for Hardcopy Digital Documents", Hecht SPIE vol. 2171, Feb. 1994, pp. 341–345.

"SmartPaper" Xerox Advertising Brochure, Dec. 1994, 6 pages.

"Color Hard Copy and Graphic Arts III", Xerox Corporation, SPIE vol. 2171, Feb. 1994, pp. 346–352.

"Let New Xerox Intran and DataGlyph™ Technologies Accelerate your Documents" Xerox Advertising Brochure, 1994, 5 pages, No Month.

"An Object Position and Orientation IC with Embedded Imager", Standley IEEE Journal of Solid State Circuits, vol. 26, No. 12, Dec. 1991, pp. 1853–1859.

*Primary Examiner*—Thien Minh Le
*Attorney, Agent, or Firm*—Fay, Sharpe, Beall, Fagan, Minnich & Mckee

[57] ABSTRACT

Bands of predetectors (92) detect the approach of lines of glyphs (12, 14) within an image being scanned. Linear lines or arrays of glyph detectors (116, 118, 120) are sampled in accordance with the detected approach of lines of glyphs. Each detector array includes a plurality of analog glyph detectors (20, 50) which respond to the presence of glyphs with a characteristic analog output. Preferably, the glyph detectors generate a corresponding analog output of a first polarity or other characteristic in response to glyphs of a first orientation and an output of a second polarity or characteristic in response to glyphs of a second orientation. The analog signals which are characteristic of the detection of a glyph are converted into binary 1's and 0's in accordance with the polarity or other characteristic of the signals. In this manner, glyphs are detected by analog detectors and the information encoded in the glyphs is directly output as a binary signal without computer analysis of the image.

24 Claims, 6 Drawing Sheets

ANALOG GLYPH DETECTOR AND DETECTOR ARRAYS

BACKGROUND OF THE INVENTION

The present invention relates to the character detection arts. It finds particular application in conjunction with the analog detection of binary glyphs which denote binary 1's and 0's and will be described with particular reference thereto. However, it is to be appreciated that the invention is also applicable to the detection of glyphs, marks, and characters of other configurations.

Glyphs are visually non-obtrusive encodings of information in the gray scale portions of pictures, drawings, logos, forms, and the like. More specifically, printers typically print black and white images by applying a series of dots of ink or toner to the print medium. A 600 dpi printer, for example, prints up to 600 dots per inch (240 dots per centimeter) in each horizontal line and prints 600 lines (240 lines per centimeter) per inch vertically. That is, each square inch contains a 600×600 grid of pixels. Black can be printed by placing a black dot in every available pixel and white by leaving the print medium white. Gray scales are depicted by adjusting the optical density of the applied ink or toner. For example, a small fraction of the pixels contain dots to depict pale gray, a large percentage for medium gray, etc.

Glyphs rearrange the dot patterns for a given gray shade in order to encode information. Rather than applying the dots for a given gray scale randomly, the dots are placed in preselected groupings of the same optical density to encode information. In one common glyph pattern, a 5×5 array of pixels are dedicated to each glyph. Three dots on a diagonal going down from left to right through the center of the pixel array define a glyph of one polarity and three dots going down from right to left through the center of the array define a glyph of the opposite polarity. These two polarity glyphs are typically used to encode binary information. Binary information can be encoded onto the print medium by printing lines of these 5×5 arrays. Such lines of glyphs have a uniform gray scale density and appear as gray bands which may be incorporated into logos, letterhead, borders, and the like. Such glyphs can also be encoded more subtly into portions of the image which already have this same gray scale level.

The glyphs may be utilized to encode an identification of the document, its date of printing, an identification of the printer on which it was printed, and the like. Glyphs may also be used in security applications to encode digital information into background or foreground gray scale regions of an image. For example, a passport image can be glyph encoded to carry a binary identification of the passport number, the name of the passport owner, a description of the person, or the like.

One of the drawbacks with glyph encoding techniques has been that reading and decoding the glyphs has been memory and computationally intensive. Typically, the image was scanned to generate an electronic bit-map of the entire page. Storing a bit-map for a page of a 600 dpi printer required a substantial memory commitment. This bit-map was then mathematically analyzed to identify the glyphs. One mathematical analysis technique included the use of a convolution filter in which a template of the glyph design was convolved with pixel regions of the image to identify the glyphs. Such page analysis techniques were so slow that it was difficult to use the glyph information in real time.

The present invention provides a new and improved glyph detection system and technique which overcomes the above-referenced problems and others.

SUMMARY OF THE INVENTION

In accordance with one aspect of the present invention, a sensing device is provided for sensing an image, the sensing device includes a plurality of sensor elements, each of which senses its own intra-sensor spatial variation of intensity. The sensor elements are organized into an array which produces signal outputs which approximate at least a portion of the image with subsensor accuracy.

In accordance with another aspect of the present invention, a glyph detection system is provided in which a print medium containing an image is passed below an optical reader. The optical reader includes an array of analog pattern sensitive detectors which detect glyphs and output analog signals indicative thereof.

In accordance with another aspect of the present invention, a method of approximating an image projected onto an array of sensor elements is provided. A parametric model is formed for the spatial intensity distribution within a sensor element, which sensor element is responsive to its own internal spatial variation of intensity. Signals from the sensor element are sensed. The parameters of the model are determined from the sensor signals. The parameters obtained from an array of the sensor elements are used to approximate the intensity distribution of the light radiated onto the array.

In accordance with another aspect of the present invention, a method of detecting glyphs is provided. A print medium on which a glyph containing image is printed is fed past an analog photosensitive detector array. The image is illuminated such that light is reflected from the image to the analog photosensitive detector array. With the analog photosensitive detector array, the glyphs are discriminated from a remainder of the image and analog signals indicative of the glyphs are generated. In this manner, the glyphs are read out directly at the detector array without computer analysis of the image.

One advantage of the present invention is that it identifies and reads glyphs in real time.

Another advantage of the present invention is that it accurately distinguishes glyphs from random dots and other dot patterns.

Another advantage of the present invention resides in its ability to read out entire lines of glyphs simultaneously and to predict and identify the location of lines of glyphs.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
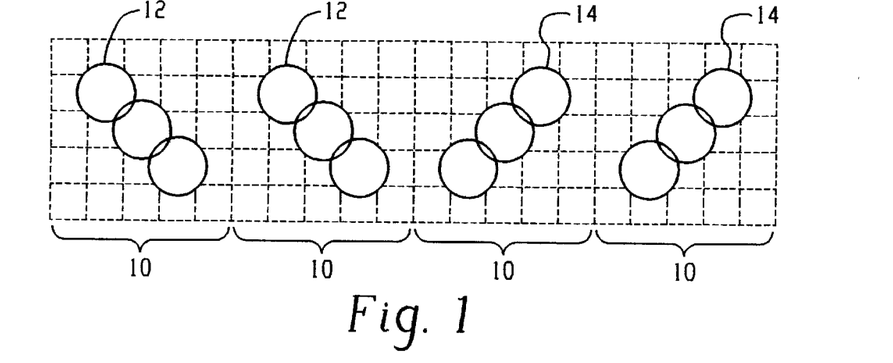
FIG. 1 is a diagrammatic illustration of a line of 5×5 pixel glyphs.

With reference to FIG. 1, an image is divisible into a multiplicity of pixel arrays, such as the illustrated 5×5 pixel array 10. In a 5×5 array, any of the 25 pixels can contain a black dot and any of the 25 pixels can be left white. In the illustrated embodiment, a glyph 12 is made up of three dots disposed on a diagonal through the center pixel. Alternately, the glyph can pass through the center pixel of the array with the opposite slope to make an opposite polarity glyph 14. In the illustrated embodiment, glyphs 12 and 14 are used to represent binary 1's and 0's. Preferably, lines of glyphs are printed in lines across portions of an image.

A sheet of print paper or other print medium containing such lines of glyphs is moved at a controlled speed past a light source and one or more arrays of light sensitive glyph detectors. The glyph detector arrays output analog signals from the read glyphs which, preferably, are converted immediately to binary digital signals. When the lines of glyphs are at known intervals, the detector array is clocked for read out in accordance with the feed rate of the paper and the interglyph line intervals.

Figure 2:
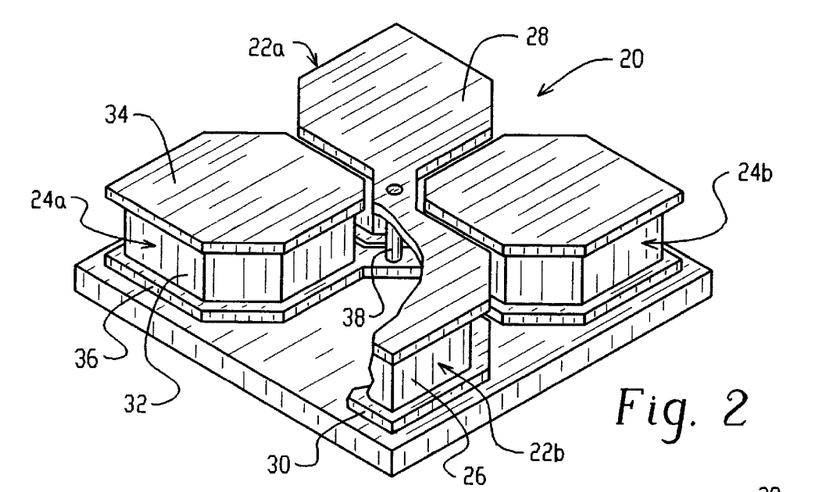
FIG. 2 is a perspective illustration in partial section of a lobed, solid-state diode detector for detecting glyphs in accordance with the present invention.
Figure 3:
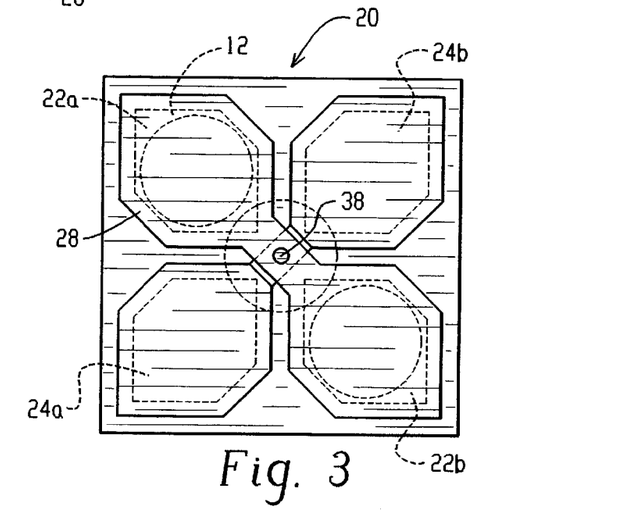
FIG. 3 is a top view of the lobed, solid-state detector of FIG. 2.
Figure 4:
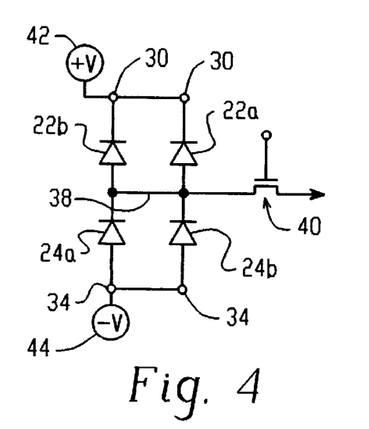
FIG. 4 is an equivalent circuit for the detector of FIG. 2.

With reference to FIGS. 2, 3, and 4, a glyph detector 20 of the illustrated embodiment has two pairs of optically sensitive elements, particularly photodiodes, including a pair 22a, 22b which are sized to fit over the end two dots of the glyph 12 and a pair 24a, 24b sized and dimensioned to overlay the end two dots of glyph 14. It is to be appreciated that the exact spacing, size, and placement of the photosensitive elements conform to the dimensions and configuration of the selected glyphs.

The photodiodes 22a, 22b each include a PN junction or PIN 26 disposed between interconnected upper electrodes 28 and lower electrodes 30. The second pair of photodiodes 24a, 24b also include junction 32 sandwiched between upper electrodes 34 and interconnected lower electrodes 36. In the illustrated embodiment, the upper electrodes 28 of photodiodes 22a, 22b are connected by way of a via 38 to the lower electrodes 36 of photodiodes 24a, 24b. These interconnected electrodes are further connected to an output transistor 40. The lower electrodes 30 of diodes 22a, 22b are connected with a positive voltage source 42. Upper electrodes 34 of diodes 24a, 24b, are connected with a negative voltage source 44. More generally, source 44 is at least several volts less than source 42. Thus, the supplies could be monopolar, e.g., +5V and 0V, or 0V and −5V.

With this configuration, if the area under one pair of electrodes is white and the area under the other pair of electrodes is dark, the output voltage is at a maximum. The maximum output voltage is positive when glyph 12 is sensed and the maximum voltage is negative in response to glyph 14. In this manner, a maximum positive or negative voltage is indicative of a binary 1 or 0. It will further be appreciated that when there is a dot under only one of the electrodes in either pair, the output signal will be significantly lower. Similarly, if all electrodes see the same thing, e.g., all white or all black dots, the output approaches 0. In this manner, the differentially arranged pair of photodiodes discriminates glyphs from random gray scale shading and differentiates glyphs of two types from each other.

Figure 5:
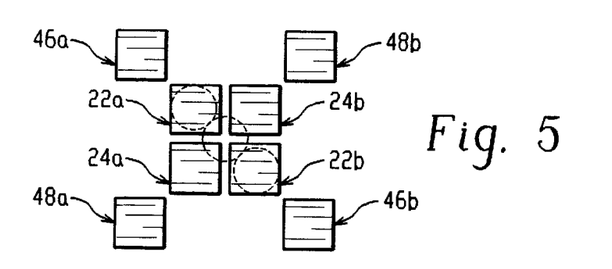
FIG. 5 illustrates an alternate embodiment of the detector of FIG. 2.

With reference to FIG. 5, a single pixel wide diagonal edge or line cutting through a field of white could be misread as a glyph. To discriminate against lines that are more than three dots long, the embodiment of FIG. 5 adds a pair of photodiodes 46a, 46b in line with photodiodes 22a, 22b. Diodes 46a, 46b detect whether a line of dots detected by 22a, 22b is more than three dots long. By making diodes 46a, 46b of opposite polarity from diodes 22a, 22b and adding their outputs, the maximum signal is produced by three dots. Analogously, a pair of photodiodes 48a, 48b are disposed in line with photodiodes 24a, 24b to determine whether any line of dots passing below photodiodes 24a, 24b is more than three dots long. In this manner, glyphs are differentiated from diagonal lines.

Figure 6:
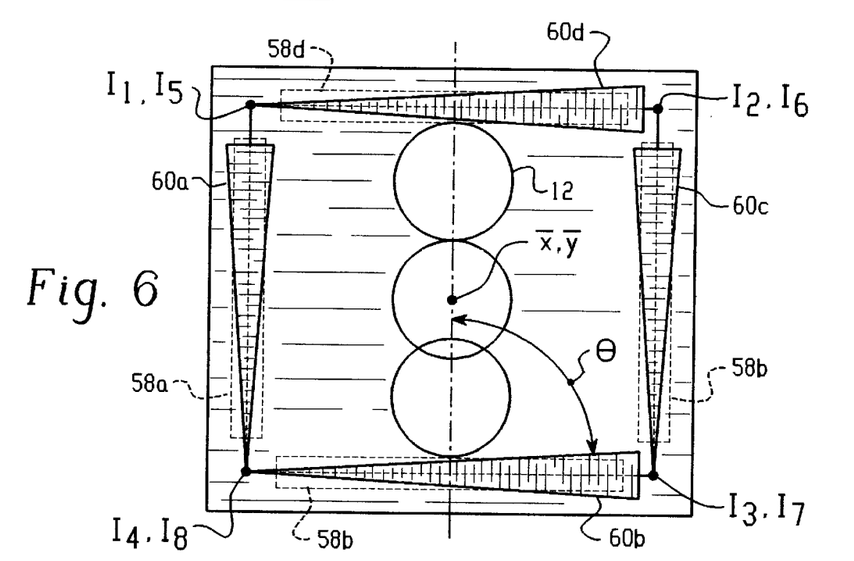
FIG. 6 is a top view of another detector embodiment which detects glyphs by detecting first and second moments.
Figure 7:
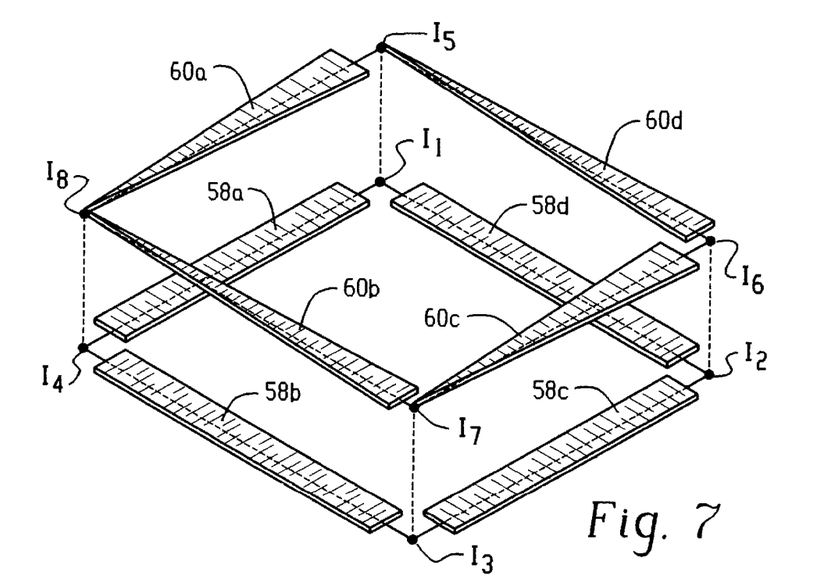
FIG. 7 is an exploded view illustrating the top and bottom contacts of the detector of FIG. 6.
Figure 8:
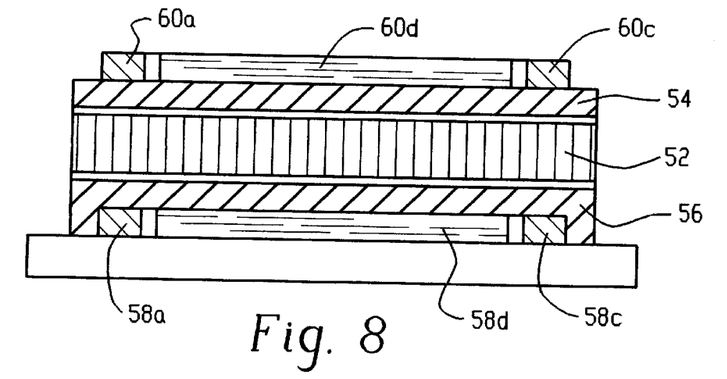
FIG. 8 is a side sectional view of the detector of FIG. 6.

With reference to FIGS. 6, 7, and 8, in a first alternate embodiment of the present invention, glyphs are detected using a moment-sensitive photosensor 50. The moment sensitive photodetector includes a vertical PIN diode 52 with resistance layers 54, 56 on opposite surfaces. Four straight resistive contact strips 58a, 58b, 58c, 58d with constant conductivity along their length frame the lower resistance layer. Analogously, four tapered resistive strips 60a, 60b, 60c, 60d frame the top resistive surface. A position sensitive detector of this nature produces output currents that vary in accordance with the portions of the resistive layer 54 which are illuminated and not illuminated. The tapered electrodes effectively sum the photo generated currents with weighting factors proportional to the square of the distance of each current source from a particular edge while the straight electrodes weight the current linearly with the distance of the source from a particular edge.

From the currents flowing in the device, the position and orientation of the light can be determined. The zero-th moment $M_o$ is determined from the sum of the currents from the straight or tapered electrodes, i.e.:

$$M_o - \text{zero-}th \text{ moment} = I_1 + I_2 + I_3 + I_4 \quad (1)$$
$$\text{or} = I_6 + I_7 + I_5 + I_8$$

The first moment of the illumination is determined from the outputs of the straight electrodes normalized by the sum of currents from all straight electrodes, i.e.:

$$\bar{x} = \text{first moment}(x) = \frac{L(I_2 + I_3)}{(I_1 + I_2 + I_3 + I_4)}, \quad (2)$$

$$\bar{y} = \text{first moment}(x) = \frac{L(I_1 + I_2)}{(I_1 + I_2 + I_3 + I_4)}. \quad (3)$$

The angle of the axis of least inertia θ is determined from the currents flowing through the tapered electrodes by first computing the quantities:

$$\frac{ac}{M_0} = \frac{(I_7 - I_5)L^2}{I_5 + I_6 + I_7 + I_8} + \frac{(I_1 + 2I_2 + I_3)(I_1 - I_3)L^2}{(I_1 + I_2 + I_3 + I_4)^2}, \quad (4a)$$

$$\frac{2b}{M_0} = \frac{2(I_2 I_4 - I_1 I_3)L^2}{(I_1 + I_2 + I_3 + I_4)^2}, \quad (4b)$$

$$\cos\theta = \frac{ac}{\sqrt{(ac)^2 + (2b)^2}}, \quad (4c)$$

$$\sin\theta = \frac{2b}{\sqrt{(ac)^2 + (2b)^2}}. \quad (4d)$$

The first moment is effectively a balance point or center of mass of the light spot(s). The second moment weights the off center light more heavily than the on center. The size of the photosensitive area is sized to match the size of a glyph 12. When the glyph oriented parallel to the electrodes is centered in the photosensitive area, the light is balanced in the x-direction and the light is balanced in the y-direction (although the light is not balanced between the x and y-directions). This effective balance is sensed by the first moment. The second moment weights the effect of the off center dots more heavily, providing an indication of the orientation.

Figure 9:
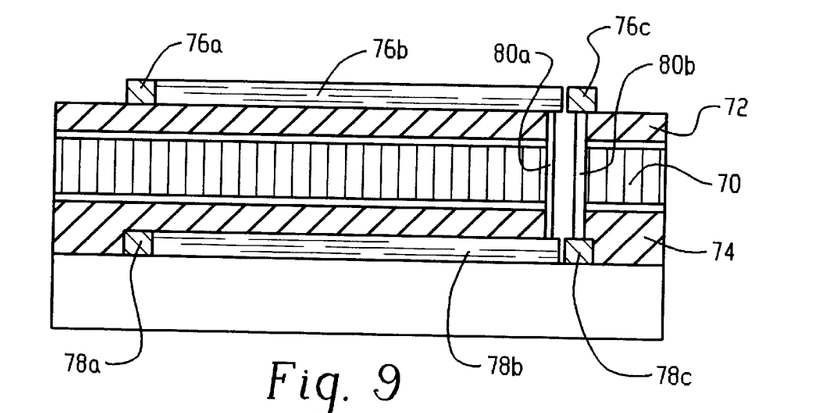
FIG. 9 is a side sectional view of yet another alternate detector embodiment incorporating a lateral photodiode.
Figure 10:
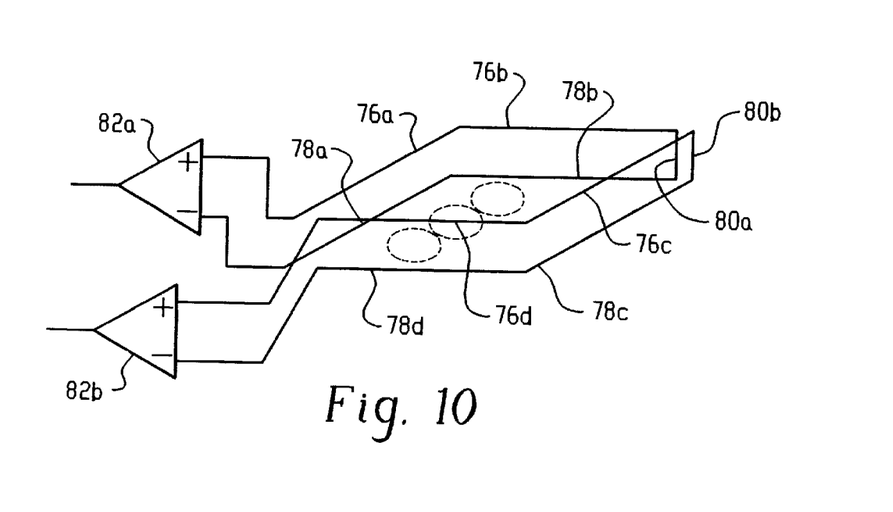
FIG. 10 is a perspective view illustrating the electrodes of the detector of FIG. 9.

With reference to FIGS. 9 and 10, in another alternate embodiment, lateral photodiodes are utilized similar to a pattern sensitive detector. A vertical PIN diode 70 has an insulating layer 72 on one face and a resistive layer 74 on the opposite face. Conductive leads 76a, 76b, 76c, and 76d are mounted on insulating layer 72. Matching resistive electrodes 78a, 78b, 78c, and 78d are mounted on the resistive layer. The conductive leads and resistive electrodes are connected by vias 80a, 80b at one corner. At the opposite corner, the conductive leads are connected to a pair of differential amplifiers 82a, 82b. This detector uses the resistive electrodes as a current divider with the two sides of the square sensor monitored in tandem. The light induced photo charge flows in the resistive layer 74 to the edges which are held close to ground. The edge current then divides in the resistance electrodes and flows to the differential amplifiers 82a, 82b or to storage capacitors. A glyph breaks the symmetry of the cell. When a glyph is centered with a vertical orientation, the output is a maximum voltage of a first polarity and when the glyph is located horizontally, the output is an opposite polarity maximum.

Figure 11:
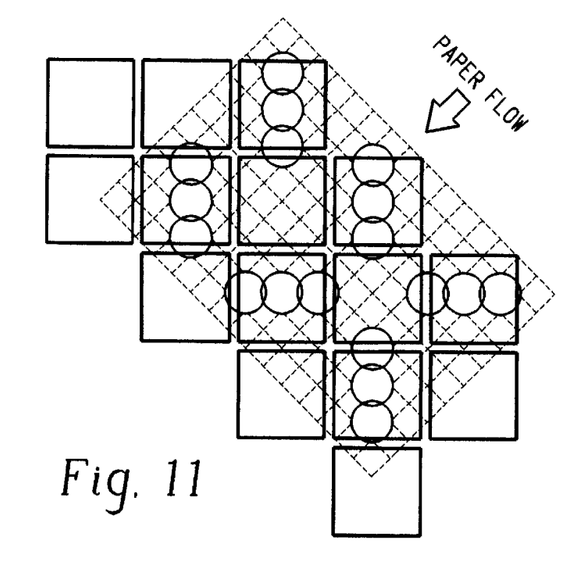
FIG. 11 illustrates an array of detectors in accordance with any of the preceding embodiments for detecting the approach of glyphs and reading the glyphs.

With reference to FIG. 11, the pattern sensitive detectors of the embodiment of FIGS. 6, 7, or 8 and the embodiment of FIGS. 9 and 10 are both sensitive to glyphs which are disposed parallel to the rectangular side walls. For glyphs as discussed above which are canted at 45° to horizontal, the detectors are rotated 45° as illustrated in FIG. 11. Moreover, because the glyphs are preferably printed in lines, the detectors are arranged in rectangular arrays of appropriate packing and spacing to match the size and spacing of the glyphs or image of glyphs projected onto detectors. The rows of detectors are spaced with the same periodicity as the glyphs. In this manner, each row of glyphs centers simultaneously on one of the rows of detectors and intermediate rows of detectors detect pure white. The sensing of pure white by alternate rows of detectors provides a double-check that glyphs are, in fact, being detected. If the glyphs are offset by half a period in the row direction, then the glyphs will align with the alternate rows of detectors. Optionally, the outputs of the alternate detector rows can be weighted to optimally identify the glyphs. Preferably, the interpreted outputs are asynchronously loaded into a binary buffer to scan out a row of glyph data.

Figure 12:
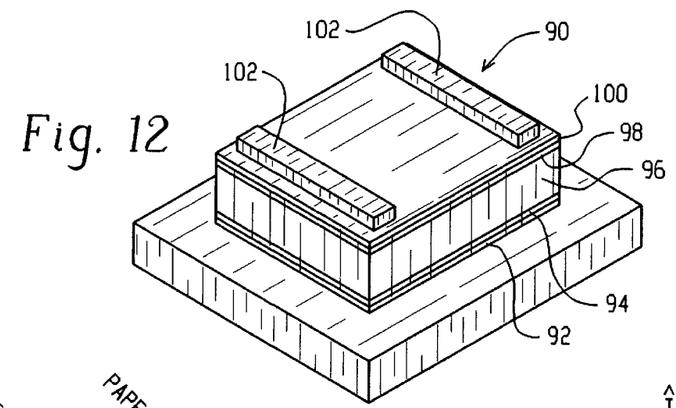
FIG. 12 is a perspective view illustrating a shaped position sensor glyph detector in accordance with the present invention.
Figure 13:
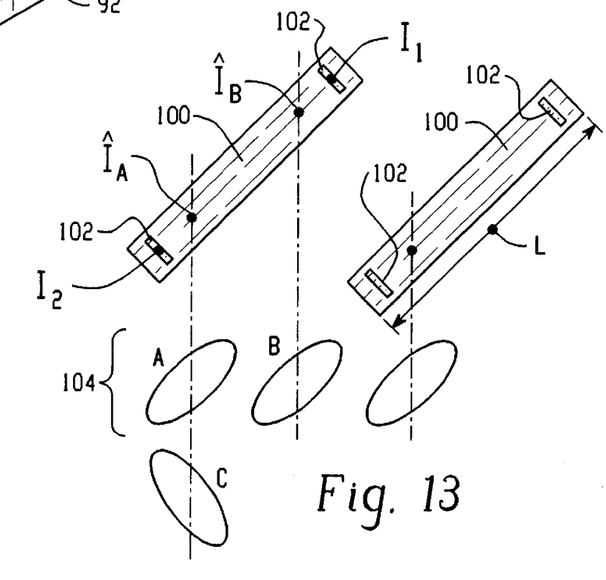
FIG. 13 illustrates the reading of glyphs with the detector of FIG. 12.

With reference to FIGS. 12 and 13, the glyphs are sensed with a shaped position sensor 90. The shaped position sensor glyph detector 90 is fabricated by applying a metal layer 92, such as chromium, on a low cost substrate such as glass. The metal layer is patterned to form the bottom collection electrode. A thin, typically 30 nanometer layer 94 of heavily doped amorphous silicon (p-type in the preferred embodiment) is deposited followed by a thicker intrinsic layer 96, typically about 500 nanometers, and finally a thin, typically 30 nanometer layer 98 of heavily n-type doped amorphous silicon. A semitransparent contact resistive layer 100 is deposited. The layers of amorphous silicon and the semitransparent contact are pattern using photolithography. A passivation layer (not shown) is deposited and holes are cut in this layer to expose the top semitransparent contact. Two contacting electrodes 102, typically aluminum, are photo lithographically fabricated to be in electrical contact with the semitransparent resistive layer 100.

With particular reference to FIG. 13, in operation, a row of the two electrode glyph detectors are mounted at a common angle with a line 104 of glyphs of a first polarity. Currents $I_1$, and $I_2$ in the electrodes 102 are measured as the glyph pattern crosses the detector. The sum of the two currents $I_1 + I_2$ is proportional to the total light falling on the detector. Thus, as a correctly aligned glyph from the row 104 moves across the detector, the sum current passes through a deep minimum. If a glyph 106 of the opposite polarity passes over the detector, the minimum is much smaller. In this manner, glyph orientation is determined from the sum of the currents. The centroid or center of mass $\hat{I}$ is given by:

$$\hat{I} = \frac{(I_1 - I_2)L}{(I_1 + I_2)}. \quad (5)$$

As a glyph A passes directly over the detector, its centroid crosses point $\hat{I}_A$. When a glyph B passes over the detector, the centroid of light moves to position $\hat{I}_B$. Thus, one shaped position sensor glyph detector measures glyphs located a more than one location through the examination of the quantity $\hat{I}$. One can also determine whether a part of the glyph lies within the detector by the position of the centroid. The shaped position sensor in this manner detects glyphs which are offcenter from the detector, allowing a less dense array of detectors to be utilized.

This arrangement is advantageous in that it does not require lateral registration of the sensor with the glyph. This avoids complex switching circuits or a dense array of sensors. One detector can detect more than one glyph, lowering the detector density requirements.

Figure 14:
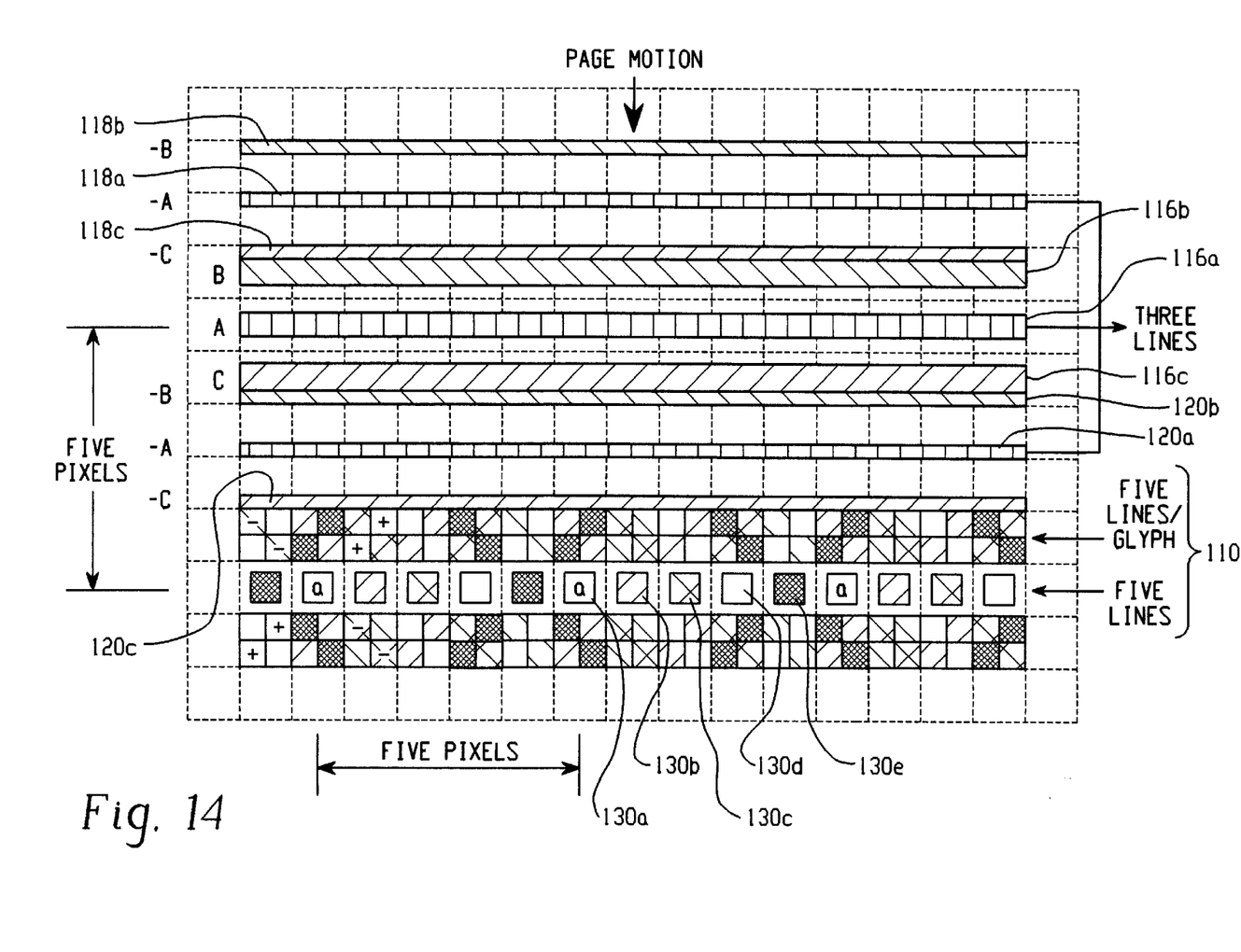
FIG. 14 illustrates an array of predetectors for detecting the approach of lines of glyphs in combination with an array of interleaved glyph detectors.

With reference to FIG. 14, detectors of the first embodiment of FIGS. 1–4 are also amenable to fabrication into an array 110. The opposing pairs of lobes are interlaced to create a row of interlaced or overlapping detectors. The rows of detectors are preceded in the feed direction by a predetector array 112 which determines the centers of rows of approaching glyphs.

The predetector array 112 includes three sets of electrodes. In each set, a central light sensitive sensor 116a, 116b, and 116c extends the length of a line. A pair of light sensitive side detectors 118a, 118b, and 118c, and 120a, 120b, or 120c extend parallel to the first predetector electrode, but offset by two and ⅜ pixels on each side (in the preferred embodiment). The side electrodes 118, 120 are also half of the width of the central electrode 116 so that the sum of their area equals that of the central electrode. The output of the corresponding side sensors 118, 120 are connected together and summed with the corresponding central sensors 116 in a manner similar to that illustrated in FIGS. 2 and 3. The outputs of 116a, 118a, 120a are generated by the summed current at the common nodes and represents the difference between the light falling on the central sensor and the sum of the corresponding side sensors. In this manner, when examining glyphs which have three dots on the diagonal and when the center dot of the glyph is centered under the central electrode 116, side electrodes 118, 120 view the white pixels on either edge of the 5×5 pixel glyph. That is, the black dots under electrode 116 produce a minimal illumination and the absence of dots below electrodes 118, 120 produce a maximum illumination output. The difference exceeds a predetermined threshold as the center of the glyph passes directly under electrode 114. The three sets of detectors are offset by one pixel.

Figure 15:
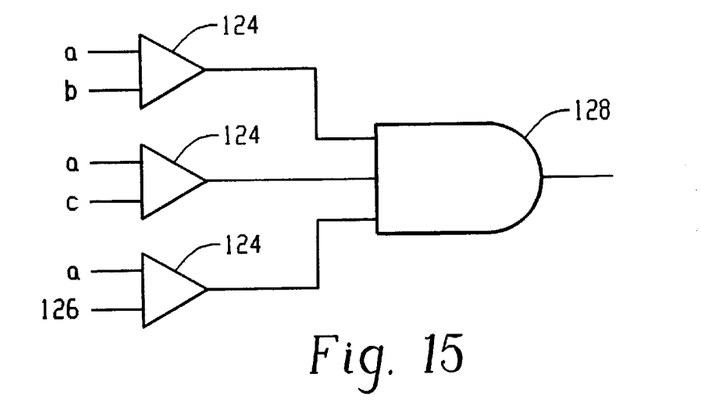
FIG. 15 illustrates a processing circuit for detecting the approach of lines of glyphs.

With reference to FIG. 15, the summed output 122a is compared 124 with the outputs 122b and 122c and with a threshold 126. The three comparisons are ANDed 128 to produce a signal indicating a row of glyphs centered under electrode 116a.

With reference again to FIG. 14, the center electrode 116a is centered 5 pixels, the dimension of a glyph or another known distance, from the center of the electrode array 110. In this manner, the validity signal indicates when one can expect to find a line of glyphs centered on the central row of the electrode array 110.

The detector array 110 includes five sets of interleaved detectors with positive polarity cells +a, +b, +c, +d, and +e on one diagonal and opposite polarity cells –a, –b, –c, –d and –e on the other diagonal. Each detector with crossed positive and negative polarity electrodes is spaced by the dimension of one glyph, 5 pixels in the preferred embodiment, from the next like detector of the same set. The sets are staggered, by 1 pixel in the illustrated embodiment, to detect whether the glyphs are aligned most closely to any one of five lateral positions. That is, if the glyphs are centered on the illustrated 5 pixel span, then the center pixel of the glyph will fall under detectors 130a; if the glyphs are offset by half a pixel to the right, then the center will fall under detectors 130b; if the glyphs are offset by a full pixel, the centers will fall under detectors 130c.

Figure 16:
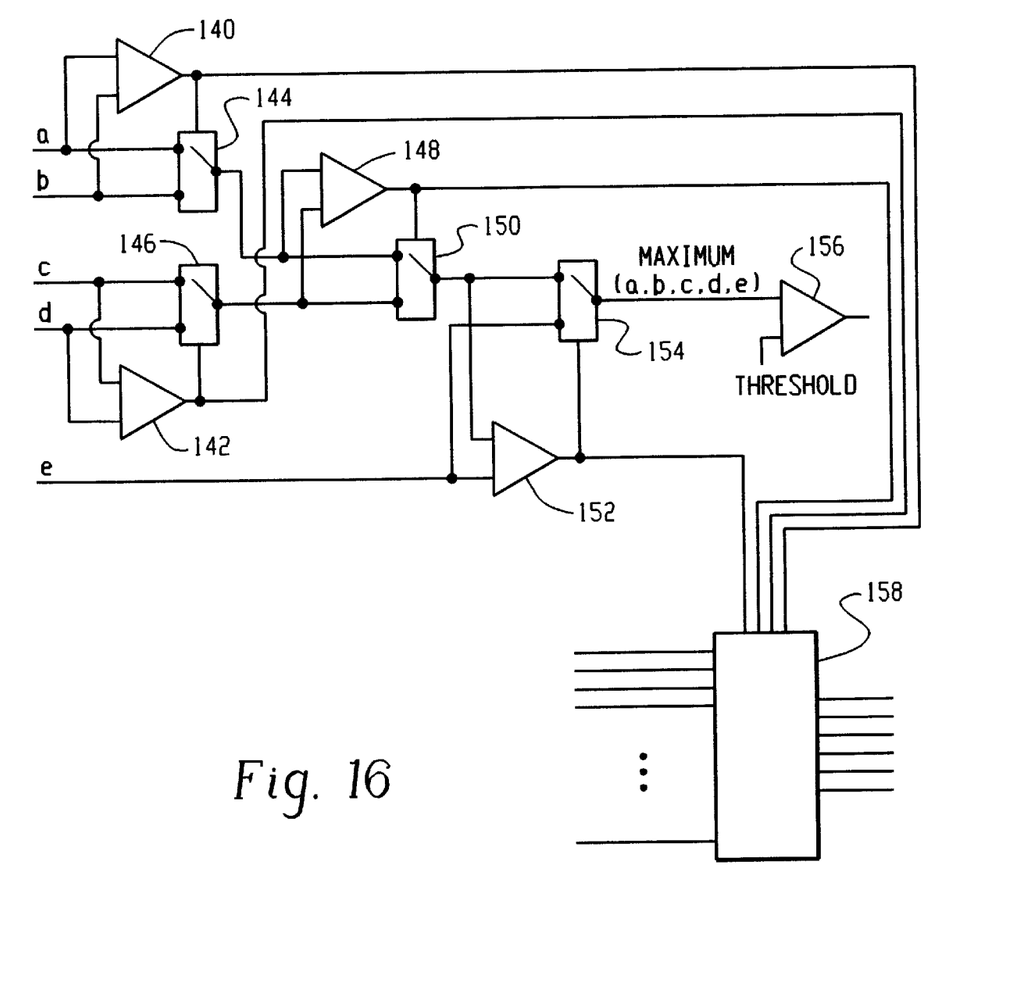
FIG. 16 illustrates a processing circuit for determining which of the interleaved glyph detection arrays is most closely aligned in a vertical direction with the lines of glyphs and a read-out circuit which is clocked in accordance with the circuit of FIG. 15 to read-out the selected array of glyph detectors.

With reference to FIG. 16, the outputs of the sets a, b, c, d, e of the detector array 130 are analyzed to determine the horizontal center of the glyphs, hence which of the detector a, b, c, d, e should be activated to read the glyphs. More specifically, the output of sets a and b are compared 140 and the output of sets c and d are compared 142. The comparison controls switches 144, 146 which switch the larger of a and b and the larger c and d to a comparitor 148. The comparitor 148 controls a switch 150 which channels the largest output to a comparitor 152 that compares the largest of a, b, c, and d with input e. The output of comparator 152 controls a switch 154 that connects the largest of a, b, c, d, and e with a comparator 156 for comparison with a threshold which shows that a row of glyphs is under the array. Further, the output for the four comparators create a four-bit binary number indicating which of sets a, b, c, d, or e is to be read. Once it is determined that a line of glyphs is centered on one of detector arrays a, b, c, d, and e, the four bit binary indication of the centered detector array controls a switch 158 which switches the signals from the selected array to parallel output lines.

It is to be appreciated that the present invention is useful with a vast array of glyph styles and shapes. Further, glyphs may be encoded in other than a binary manner, for example, line glyphs of the type described above may be disposed at 45° intervals to produce an output which can take on any one of four states to carry two bits worth of information.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. In a glyph detection system in which a print medium contains an image embedded with visually non-obtrusive glyphs that encode information in gray scale portions of the image, which medium is passed nearby an optical reader, the improvement comprising:

the optical reader including an array of analog pattern sensitive detectors which:
discriminate the glyphs from gray scale portions without encoded information,
detect the glyphs, and output analog signals indicative of the detected glyphs.

2. In the glyph detector as set forth in claim 1, the improvement further comprising:

an analog-to-digital converter for converting the analog output of the analog pattern sensitive detector into a digital signal in accordance with the detected glyphs, wherein a digital glyph indicating signal is generated without software analysis of the image.

3. In a glyph detector system in which a print medium containing an image is passed nearby an optical reader, the optical reader comprising:

an array of analog pattern sensitive detectors which detect glyphs and generate analog signals indicative thereof;
a predetector array of photosensitive elements disposed upstream from the array of analog pattern sensitive detectors to detect the approach of a line of glyphs.

4. A glyph reading system for reading glyphs which are embedded in gray scale portions of an image on print medium passing thereunder, the glyph reading system comprising:

a plurality of analog pattern sensitive detectors which:
distinguish the glyphs from adjoining gray scale portions of the image,
read the glyphs on a print medium passing there adjacent, and
produce an analog signal indicative of the read glyphs without indicating adjoining non-glyph gray scale.

5. The glyph reading system as set forth in claim 4 further including:

a glyph detection system disposed adjacent the analog pattern sensitive detectors for detecting glyphs moving toward the plurality of analog pattern sensitive detectors.

6. A glyph reading system for reading glyphs on passing media, the glyph reading system comprising:

a plurality of analog pattern sensitive detectors positioned to read glyphs on a medium passing adjacent and producing an analog signal indicative of read glyphs, the pattern sensitive detectors including:
a photosensitive detector having four symmetrically disposed lobes, with oppositely disposed pairs of lobes being connected electrically in parallel.

7. A glyph reading system for reading glyphs on print medium passing thereunder, the glyph reading system comprising:
a plurality of analog pattern sensitive detectors positioned to read glyphs on a print medium passing there adjacent and producing an analog signal indicative of read glyphs, each analog pattern sensitive detector including:
first, second, third, and fourth light sensitive PIN diodes disposed in a rectangular array, with the first and third PIN diodes being disposed diagonally opposite and the second and fourth PIN diodes being disposed diagonally opposite;
a first electrode surface electrically connected with anodes of the first and third PIN diodes;
a second electrode surface electrically connected with cathodes of the second and fourth PIN diodes, the first and second electrode surfaces being electrically interconnected;
a positive voltage bias connected with cathodes of the first and third PIN diodes;
a negative voltage bias connected with anodes of the second and fourth PIN diodes.

8. The glyph reading system as set forth in claim 7 further including a gated transistor connected with the first and second electrode surfaces.

9. A glyph reading system for reading glyphs on print medium passing thereunder, the glyph reading system comprising:
an analog pattern sensitive detector which reads glyphs on a print medium and producing an analog signal indicative of read glyphs, the analog pattern sensitive detector including:
a vertical PIN diode;
a bottom resistance layer connected with one surface of the PIN diode and a top resistance layer connected with an opposite surface of the PIN diode;
an array of top contacts electrically connected with the top resistance layer, the top contacts including four tapered conductive resistance contacts;
an array of bottom contacts including four linear conductive contacts.

10. A glyph reading system for reading glyphs on a printed medium, the glyph reading system comprising:
an analog pattern sensitive detector positioned to read the glyphs and produce an analog signal indicative of the read glyphs, the analog pattern sensitive detector including:
a vertical PIN diode;
a resistance layer disposed on one surface of the vertical PIN diode and an insulating layer disposed on an opposite surface of the vertical PIN diode;
a top conductive lead array mounted on the insulating layer, the top conductive leads including a first lead which extends substantially along two sides of a square and a second lead which extends along two opposite sides of the square;
a bottom resistive electrical lead array including a first bottom electrical lead extending substantially along two sides of a square and a second bottom electrical lead extending along two opposite sides of the square;
electrical interconnections for interconnecting ends of the top and bottom leads adjacent one corner of the squares;
differential amplifiers connected with free ends of the top and bottom leads adjacent an opposite end of the squares.

11. A glyph sensing system for reading glyphs on a glyph encoded medium, the glyph reading system comprising:
a plurality of pattern sensitive detectors positioned to read the glyphs and produce an analog signal indicative of the read glyphs, the pattern sensitive detectors each including:
a substrate;
a first pair of electrodes supported on the substrate;
a PIN diode mounted on the first pair of electrodes;
a pair of collection electrodes mounted on the PIN diode.

12. A glyph reading system for reading glyphs on an adjacent medium, the glyph reading system comprising:
a plurality of pattern sensitive detectors positioned to read the glyphs on the medium and produce a signal indicative of the read glyphs, the pattern sensitive detectors each including:
a vertical PIN diode;
a plurality of electrodes on opposite faces of the vertical PIN diode.

13. A glyph reading system for reading approaching glyphs on an associated medium, each glyph including three dots disposed along one of two orthogonal, diagonal directions, the glyph reading system comprising:
a plurality of analog pattern sensitive detectors positioned to read approaching glyphs on the associated medium and to produce an analog signal indicative of read glyphs; and
an approaching glyph sensor disposed adjacent the analog pattern sensitive detectors for detecting glyphs approaching the plurality of pattern sensitive detectors, the approaching glyph sensor including:
three light sensitive bands which are spaced apart such that when a center pixel of the glyph is centered on the center band, the outer bands are disposed beyond the glyph, the center band being opposite biased relative to the outer bands and their outputs being interconnected such that the output of the bands exceeds a preselected threshold when a line of glyphs is centered under the central band.

14. The glyph reading system as set forth in claim 13 wherein the plurality of analog pattern sensitive detectors includes a plurality of arrays of interleaved pattern sensitive detectors, the arrays being offset from each other by a glyph or contact thereof, the array most closely aligned with the glyphs passing thereunder, reading out the glyphs.

15. A sensing device for sensing an image, said sensing device comprising a plurality of sensor elements, each of said sensor elements sensing its own intra-sensor spatial variation of intensity, said sensor elements being organized into an array having signal outputs, said signal outputs approximating at least a portion of said image with subsensor accuracy.

16. A method of approximating an image projected onto an array of sensor elements, said method comprising:
forming a parametric model for the spatial intensity distribution within a sensor element, said sensor element being responsive to its own internal spatial variation of intensity;
sensing signals from said sensor element;

determining the parameters of said model from said sensor signals; and using said parameters obtained from an array of said sensor elements to approximate the intensity distribution of light radiated onto the array.

17. The method as set forth in claim 16 wherein the image includes a plurality of glyphs of a first characteristic and a plurality of glyphs of a second characteristic, which first and second characteristic glyphs cause sensor signals with first and second signal characteristics and wherein said using step includes identifying the first and second characteristic glyphs.

18. A method of detecting glyphs, the method comprising:

feeding a print medium on which a glyph containing image is printed past an analog photosensitive detector array;

illuminating the image such that light from the image strikes the analog photosensitive detector array;

with the analog photosensitive detector array, discriminating the glyphs from a remainder of the image and generating analog signals indicative of the glyphs, such that the glyphs are read out directly at the detector array without computer analysis of the image.

19. The method as set forth in claim 18 wherein the glyphs each have one of first and second polarities and the step of generating an analog signal includes generating an analog signal of a first polarity in response to the first polarity glyph and an analog signal of a second polarity in response to the second polarity glyph, and further including converting the first and second polarity analog signals into binary signals.

20. The method as set forth in claim 18 wherein the photosensitive detector array includes at least one line of photosensitive detectors for concurrently detecting at least one line of glyphs.

21. The method as set forth in claim 18 further including:

examining the image as it advances toward the analog photosensitive detector array to determine a presence of lines of glyphs;

sampling the analog photosensitive detector array in coordination with the advancement of the detected lines of glyphs.

22. A method of detecting glyphs which extend along diagonals, the method comprising:

feeding a medium which carries a glyph containing image past an analog photosensitive detector array;

illuminating the image such that light from the image strikes the analog photosensitive detector array;

with the analog photosensitive detector array, (i) discriminating the glyphs from a remainder of the image, (ii) detecting the glyphs with crossed detectors which are differentially interconnected, (iii) from the glyphs with a first orientation producing a positive analog signal, and (iv) from the glyphs of a second orientation producing a negative analog signal.

23. A method of detecting glyphs, the method comprising:

moving a medium carrying a glyph containing image relative to a photosensitive detector array;

illuminating the image such that illumination from the image strikes the photosensitive detector array;

with the photosensitive detector array:

discriminating the glyphs from a remainder of the image and generating analog signals indicative of the glyphs, such that the glyphs are read out at the detector array;

determining a centroid of the illumination falling on each detector;

analyzing a magnitude of the centroid to identify glyphs and glyph polarities.

24. A method of detecting glyphs, the method comprising:

feeding a print medium on which a glyph containing image is printed past a plurality of offset linear photosensitive detector arrays;

illuminating the image such that illumination from the image strikes the photosensitive detector arrays;

examining the image as it advances toward the analog photosensitive detector array to determine a presence of glyphs; and detecting the glyphs with a one of the plurality of photosensitive detector arrays which most closely aligns with the glyphs.

* * * * *